United States Patent [19]

Harada et al.

[11] Patent Number: 5,345,546
[45] Date of Patent: Sep. 6, 1994

[54] METHOD AND APPARATUS FOR GENERATING FILLET SURFACE BETWEEN TWO SURFACES

[75] Inventors: Tsuyoshi Harada, Kawasaki; Kouichi Konno, Tokorozawa, both of Japan

[73] Assignee: Ricoh Company, Ltd., Tokyo, Japan

[21] Appl. No.: 809,450

[22] Filed: Dec. 19, 1991

[30] Foreign Application Priority Data

Dec. 20, 1990 [JP] Japan .................. 2-413222

[51] Int. Cl.⁵ .......................................... G06F 15/62
[52] U.S. Cl. ................... 395/142; 395/119; 395/120; 395/155; 395/161; 395/141; 364/474.24
[58] Field of Search ................ 395/141–143, 395/119, 120, 155, 161; 364/474.24, 474.25, 474.26

[56] References Cited

U.S. PATENT DOCUMENTS 5,119,309  6/1992  Cavendish et al. ............ 364/474.24

OTHER PUBLICATIONS

Chiyokura et al. (Department of Precision Machinery Engineering, University of Tokyo), "Design of Solids with Free-Form Surfaces", *Computer Graphics*, vol. 17, No. 3 (1983).

Alyn P. Rockwood et al, "Blending Surfaces in Solid Modeling," *Geometric Modeling*, 1987, pp. 367–383.

Christoph Hoffman et al, "The Potential Method for Blending Surfaces and Corners", *Geometric Modeling*, 1987, pp. 347–365.

B. K. Choi et al, "Constant-radius blending in surface modelling", *Computer Aided Design*, vol. 21, No, 4, 1989, pp. 213–220.

Tamas Varady, "Rolling Ball Blends in Solid Modelling," *Computer Applications in Production and Engineering*, 1989, pp. 295–308.

M. A. Sanglikar et al, "Modelling rolling ball blends for computer aided geometric design," *Computer Aided Geometric Design*, 1990, pp. 399–413.

*Primary Examiner*—Heather R. Herndon
*Assistant Examiner*—Almis Jankus
*Attorney, Agent, or Firm*—Mason, Fenwick & Lawrence

[57] ABSTRACT

A 3-dimensional (3-D) Computer Aided Design (CAD) System generates a fillet surface which smoothly connects two surfaces to each other. This is accomplished by sliding a circle on a normal plane of a user-designated spine curve which is in contact with two surfaces. Then, the fillet surface is approximated by Gregory patches which are generated from trajectories of two tangent points between the circle and the two surfaces. The fillet surface thus expressed by the Gregory patches is easily and efficiently processed in computers such as those in 3D CAD systems. Because the fillet surface is generated along the spine curve, various fillet surfaces, including that generated by the conventional rolling-ball blending method, can be generated to satisfy various needs of designers of 3-D CAD Systems.

22 Claims, 12 Drawing Sheets

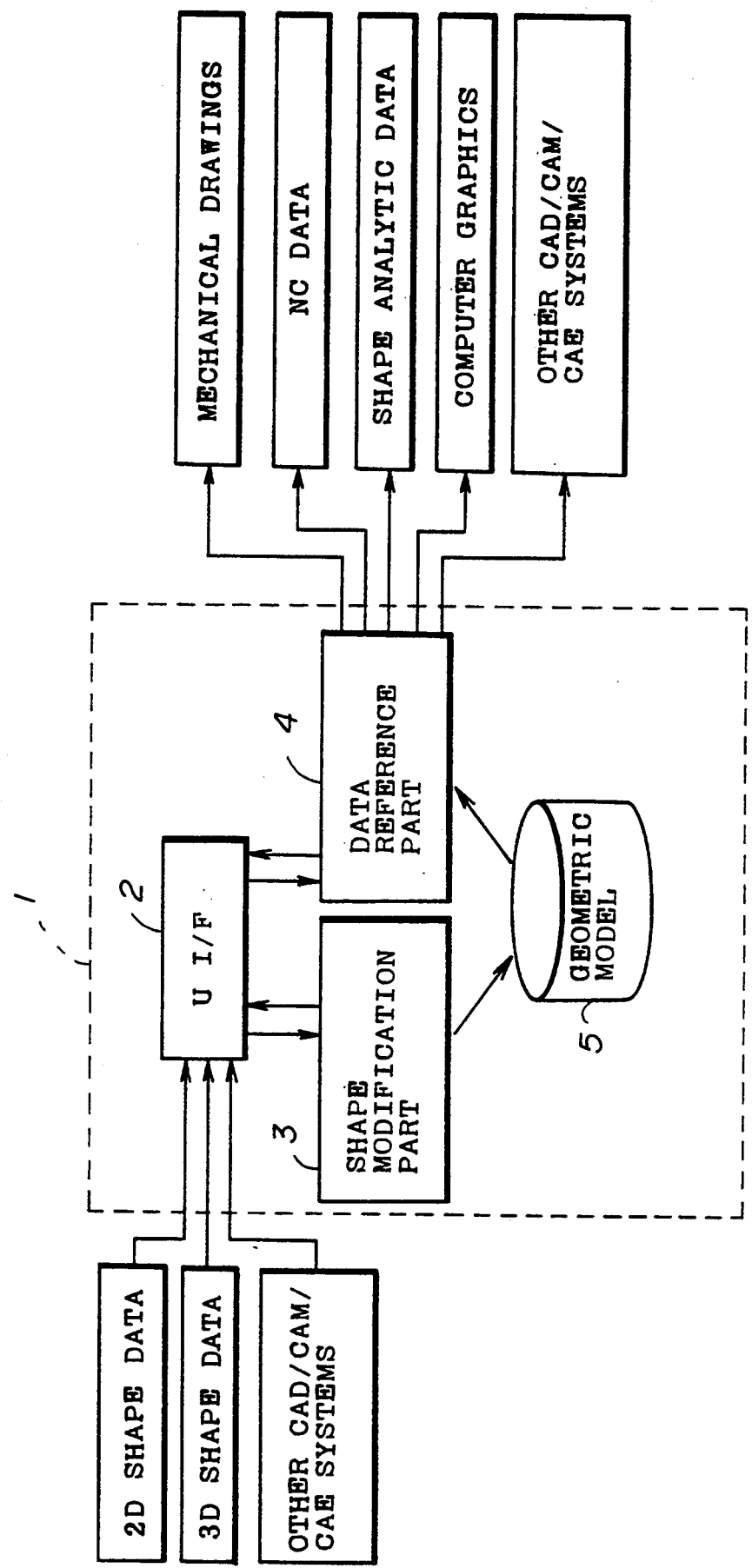

FIG. 6

STEP 1.1: CALCULATE POINT P ON SPINE CURVE R, NORMAL PLANE F OF THE SPINE CURVE R, AND RADIUS r OF FILLET SURFACE

STEP 1.2: ESTABLISH INITIAL POINTS Pa AND Pb ON THE SURFACES Sa AND Sb, EACH OF THE POINTS Pa AND Pb BEING LOCATED AT POINTS CLOSEST TO THE POINT P, AND CALCULATE PARAMETER (ua, Va) CORRESPONDING TO THE POINT Pa AND PARAMETER (ub, vb) CORRESPONDING TO THE POINT Pb

STEP 1.3: CALCULATE TANGENTIAL PLANES Fa AND Fb AT THE POINTS Pa AND Pb ON THE SURFACE Sa AND Sb

STEP 1.4: CALCULATE NODAL LINES La AND Lb BETWEEN THE NORMAL PLANE F AND THE TANGENTIAL PLANES Fa AND Fb

STEP 1.5: PLACE CIRCLE HAVING THE RADIUS r ON THE NORMAL PLANE F WHILE BEING IN CONTACT WITH THE LINES La AND Lb

STEP 1.6: |P'a − Pa| < ε AND |P'b − Pb| < ε ?

STEP 1.7: CALCULATE NEXT INITIAL POINTS (u'a, v'a) AND (u'b, v'b) BY USING THE POINTS P'a AND P'b

SUBSTITUTE (u'a, v'a) FOR (ua, va) AND (u'b, v'b) FOR (ub, vb), AND CALCULATE Pa AND Pb CORRESPONDING TO THE PARAMETERS Pa AND Pb

STEP 1.8: STORE TANGENT POINT Pa AND Pb IN THE GEOMETRIC MODEL AND THEN TERMINATE THE PROCEDURE

METHOD AND APPARATUS FOR GENERATING FILLET SURFACE BETWEEN TWO SURFACES

BACKGROUND OF THE PRESENT INVENTION

The present invention relates to a method and apparatus for generating a fillet surface between two surfaces. The present invention is particularly useful for a three-dimensional (3D) computer aided design (CAD) system.

A present 3D CAD system must process various complicated surfaces of a mechanical model, and it usually rounds edges and boundaries of two surfaces thereof for the following three reasons; to simplify production, to increase mechanical strength, and to beauty the outline of the finished goods of the models. The term "a fillet surface", as used herein, means the round surface of the model processed by the above 3D CAD system. Various methodologies for generating a fillet surface have been proposed, such as in (1) Rockwood, et al., "Blending Surfaces in Solid Modeling" (Geometric Modeling SIAM, G.Farin Ed., Philadelphia, Pa., U.S.A., pp.367–383, 1987); (2) Hoffmann et al., "The Potential Method for Blending Surfaces and Corners" (Geometric Modeling SIAM, G.Farin Ed., Philadelphia, Pa., U.S.A., pp.347–365, 1987); (3) Choi et al., "Constant-radius Blending in Surface Modeling" (Computer Aided Design, Vol 21, No.4, pp.213–220, 1989); (4) Varady et al., "Rolling Ball Blends in Solid Modeling" (Computer Applications in Production and Engineering, F.Kimura and A.Rolstadas Ed., Elsevier Science Publishers B.V., North-Holland, pp.295–308, 1989); and (5) Sanglikar et al., "Modeling Rolling Ball Blends for Computer Aided Geometric Design" (Computer Aided Design, Vol 7., pp.399–414, 1990). The above first, third, fourth, and fifth documents use the so-called rolling-ball blending method, in which a concave part D shown in FIGS. 1A and 1B generated by two surfaces $S_a$ and $S_b$ of a mechanical model is processed by placing a ball B having a constant radius r, as shown in FIG. 1C, in contact with the two surfaces $S_a$ and $S_b$, then rounding the ball B along a boundary curve between the two surfaces $S_a$ and $S_b$, and connecting the surface $S_a$ and $S_b$ to each other via a fillet surface $F_i$ generated by a surface of the ball B.

However, the conventional rolling-ball blending method has the following disadvantage, namely that the method cannot generate various fillet surfaces in accordance with the designer's requirement since the fillet surface generated by the rolling-ball is uniformly determined. Thus, the rolling-ball blending method cannot satisfy a designer who, for example, wishes to connect the two surfaces to each other via a fillet surface having a constant radius with respect to a normal surface of a spine curve R shown in FIG. 1A which is specifically defined by the designer. In addition, according to the above first, second, third, and fifth documents, the fillet surface is an analytic surface defined by a very high-degree equation, such as an implicit function (in the first and second documents) and a specific parametric surface having no control point (in the third and fourth documents), and often expressed by a root and/or trigometric function, so that it takes much time to calculate a derivative, normal vector, and intersection of the fillet surface. Furthermore, since it is difficult for a conventional 3D CAD to process such a fillet surface, such as translation and/or rotation, enlargement, shrinkage, and data exchange.

SUMMARY OF THE INVENTION

Accordingly, it is a general object of the present invention to provide a novel and useful method for generating a fillet surface, in which the above disadvantages are eliminated.

Another more specific object of the present invention is to provide a method and apparatus for generating various fillet surfaces in accordance with needs of a designer, the fillet surfaces being defined by a low enough degree equation to process it.

According to a first feature of the present invention, a method for generating a fillet surface which smoothly connects two surfaces to each other comprises the steps of designating a spine curve near a boundary between the two surfaces, placing a predetermined curve on a normal plane of the spine curve at an arbitrary point on the spine curve so that the predetermined curve can be in contact with the two surfaces, sliding the predetermined curve, while being in contact with the two surfaces, in order to generate trajectories of two tangent points between the predetermined curve and the two surfaces, the fillet surface being defined by a trajectory of the predetermined curve and the trajectories of the two tangent points, and generating a parametric surface which approximately and parametrically represents the fillet surface, by using the trajectories of the two tangent points and the predetermined curve.

According to a second feature of the present invention, a method for generating a fillet surface which smoothly connects two surfaces to each other comprises the steps of designating a spine curve near a boundary between the two surfaces, placing a circle on a normal plane of the spine curve at an arbitrary point on the spine curve so that the circle can be in contact with the two surfaces, sliding the circle, while being in contact with the two surfaces, in order to generate trajectories of two tangent points between the circle and the two surfaces, the fillet surface being defined by a trajectory of an outline of the circle and the trajectories of the two tangent points, and generating a Gregory patch which approximately and parametrically represents the fillet surface, by using the trajectories of the two tangent points and the outline of the circle.

According to a third feature of the present invention, a method for generating a fillet surface which smoothly connects two surfaces to each other comprises the steps of designating a spine curve defined by a parameter t near a boundary between the two surfaces, dividing equally the spine curve into 2n parts, placing 2n+1 number of circles each having a radius expressed by a function having the parameter t, on 2n+1 number of normal planes of the spine curve at 2n+1 number of points on the spine curve, each of the points being defined by the parameter $t = i/2n$ ($i = 0, 1, 2, \ldots 2n-1, 2n$), and each of the circles being in contact with the two surfaces, sliding each of the circles, while being in contact with the two surfaces, in order to generate a movement vector representing how each of tangent points between each of the circles and the two surfaces moves when each of the circles slides, generating n number of Bezier curves by each of the tangent points and the movement vector, the Bezier curves approximately and parametrically representing a trajectory of each of the tangent points, and generating a Gregory patch which approximately and parametrically represents the fillet surface, by using the Bezier curve and an outline of each of the circles.

According to a fourth feature of the present invention, an apparatus which receives shape data representing a shape of a model comprises processing means for processing the shape data, memory means, coupled to the processing means, for storing the shaped data processed by the processing means, and reference means, coupled to the memory means, for extracting data stored in the memory means, wherein the processing means generates a fillet surface which smoothly connects two surfaces of the model to each other and comprises drawing means for drawing a spine curve near a boundary between the two surfaces, setting means for placing a predetermined curve on a normal plane of the spine curve at an arbitrary point on the spine curve so that the predetermined curve can be in contact with the two surfaces, moving means for sliding the predetermined curve, while being in contact with the two surfaces, in order to generate trajectories of two tangent points between the predetermined curve and the two surfaces, the fillet surface being defined by a trajectory of the predetermined curve and the trajectories of the two tangent point, and fillet surface generating means for generating a parametric surface which approximately and parametrically represents the fillet surface, by using the trajectories of the two tangent points and the predetermined curve.

According to a fifth feature of the present invention, an apparatus which receives shape data representing a shape of a model comprises processing means for processing the shape data, memory means, coupled to the processing means, for storing the shaped data processed by the processing means, and reference means, coupled to the memory means, for extracting data stored in the memory means, wherein the processing means generates a fillet surface which smoothly connects two surfaces of the model to each other and comprises drawing means for drawing a spine curve near a boundary between the two surfaces, setting means for placing a circle on a normal plane of the spine curve at an arbitrary point on the spine curve so that the circle can be in contact with the two surfaces, moving means for sliding the circle, while being in contact with the two surfaces, in order to generate trajectories of two tangent points between the circle and the two surfaces, the fillet surface being defined by a trajectory of an outline of the circle and the trajectories of the two tangent points, and fillet surface generating means for generating a Gregory patch which approximately and parametrically represents the fillet surface, by using the trajectories of the two tangent points and the outline of the circle.

According to a sixth feature of the present invention, an apparatus which receives shape data representing a shape of a model comprises processing means for processing the shape data, memory means, coupled to the processing means, for storing the shaped data processed by the processing means, and reference means, coupled to the memory means, for extracting data stored in the memory means, wherein the processing means generates a fillet surface which smoothly connects to each other two surfaces of the model and comprises drawing means for drawing a spine curve defined by a parameter t near a boundary between the two surfaces, dividing means for equally dividing the spine curve into 2n parts, setting means for placing 2n+1 number of circles whose radius is expressed by a function having the parameter t, on 2n+1 number of normal planes of the spine curve at 2n+1 number of points on the spine curve, each of the points being defined by the parameter $t=i/2n$ ($i=0, 1, 2 \ldots 2n-1, 2n$), and each of the circles being in contact with the two surfaces, moving means for sliding each of the circles, while being in contact with the two surfaces, in order to generate a movement vector representing how each of tangent points between each of the circles and the two surfaces moves when each of the circles slides, approximating means for generating n number of Bezier curves by each of the tangent points and the movement vector, the Bezier curves approximately and parametrically representing a trajectory of each of the tangent points, and fillet surface generating means for generating a Gregory patch which approximately and parametrically represents the fillet surface, by using the Bezier curve and an outline of each of the circles.

According to the present invention, since the fillet surface is approximately expressed as a parametric surfaces, it can be easily processed. In addition, since the fillet surface is generated based on the spine curve designated by a designer, various fillet surfaces suitable for various needs of the designer can be generated.

Other objects and further features of the present invention will become apparent from the following detailed description when read in conjunction with the accompanying drawings.

BRIEF DESCRIPTION OF THE DRAWINGS

FIG. 2 shows a block diagram of a 3D CAD according to the present invention;

FIG. 6 shows a flowchart for explaining a method for computing tangent points between the circle and two surface, executed by the shape modification part shown in FIG. 2;

DETAILED DESCRIPTION OF THE PREFERRED EMBODIMENTS

A 3D CAD 1 according to the present invention comprises, as shown in FIG. 2, a user interface (U I/F), shape modification part 3, data reference part 4, and geometric model 5. The user interface 2 is connected to the shape modification part 3 and data reference part 4. The shape modification part 3 is further connected to the geometric model 5. The data reference part 4 is further connected to the geometric model 5. The user interface 2 has many input terminals to receive 2D shape data and 3D shape data from a user of the 3D CAD or other CAD/CAM/CAE systems. The shape modification part 3 processes the 2D shape data and 3D shape data in accordance with the method according to the present invention, which will be described later. The data reference part 4 stores reference shape data used for mechanical drawings, NC data, shape analytic data, computer graphics, and other CAD/CAM/CAE systems. The geometric model 5 stores data which represents a mechanical model.

A description will now be given of the method for generating a fillet surface according to the present invention, executed by the primitive operations part 3 in the 3D CAD 1, with reference to FIGS. 3A to 3F an FIG. 4. In FIGS. 3A to 3F, $S_a$ and $S_b$ denote surfaces, R denotes a spine curve, A(i), A(2j), and A(2j+2) denote arcs, V(i,a), V(i,b), V(2j,a), V(2j+2,a) and q(i) denote movement vectors, C(j,a) and C(j,b) each denote Bezier curves, P(i,a), P(i,b), P(2j,a) and P(2j+2,a) each denote tangent points, q(i,a) and q(i,b) denote tangent vectors, and G(j) denotes a Gregory patch. In addition, n=4 in FIGS. 3A to 3F. The method for generating the fillet surface according to the present invention comprises the following five steps, as shown in FIG. 4. The two surfaces $S_a$ and $S_b$ shown in FIGS. 3A to 3F are respectively defined by parametric surfaces $S_a$ (u,v) and $S_b$(u,v) having two parameters u and v ($0 \leq u$, $v \leq 1$). The spine curve R which defines a section and a cross-section radius of the fillet surface is defined by a parametric curve R(t) having a parameter t ($0 \leq t \leq 1$), the cross-section radius of the fillet surface being expressed by a function r(t) having the parameter t. According to the present invention, a fillet surface having a variable cross-section radius can be generated. The natural number n denotes the number of Gregory patches to be generated. The following steps 1 to 3 explain procedure for generating a trajectory, and steps 4 and 5 explain procedure for generating a Gregory patch.

Figure 3A:
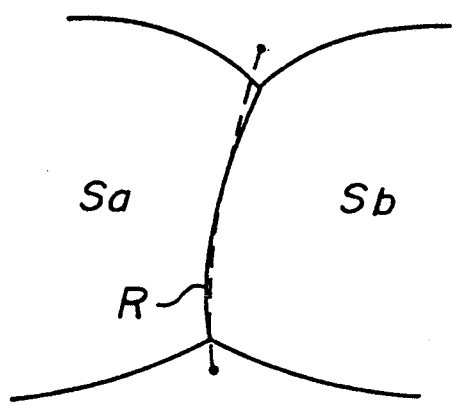
FIGS. 3A to 3F respectively show views for explaining a method for generating a fillet surface according to the present invention, executed by a shape modification part shown in FIG. 2.
Figure 3B:
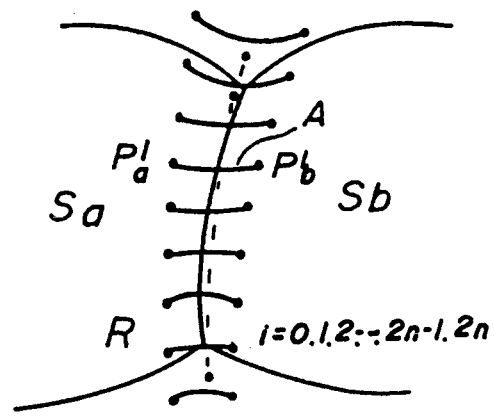
Figure 4:
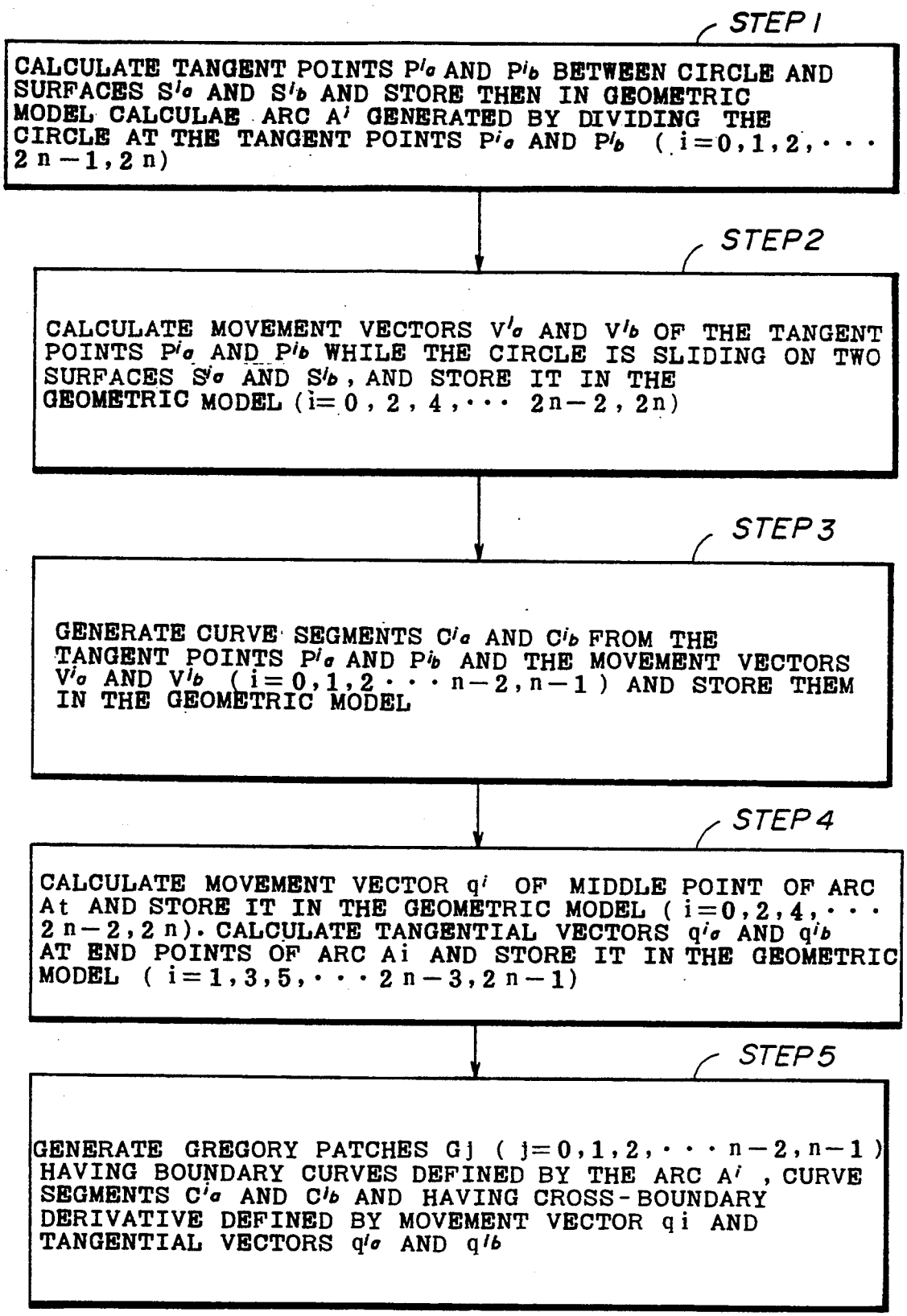
FIG. 4 shows a schematic flowchart of five steps of the method executed by the shape modification part shown in FIG. 2.

In Step 1:

The spine curve R is defined with respect to the two surfaces $S_a$ and $S_b$ shown in FIG. 3A by the designer. Next, as shown in FIG. 3B, the spine curve R is equally divided into 2n parts in a space of the parameter t, and the normal plane of the spine curve R is calculated at each of 2n+1 divided points t=i/2n (i=0, 1, 2 ... 2n−1, 2n). After each circle having a radius r(t) is placed on a corresponding normal plane of the spine curve R so that each circle can be in contact with the two surfaces $S_a$ and $S_b$, tangent points P(i,a) and P(i,b) between each circle and the two surfaces $S_a$ and $S_b$ are computed and stored in the geometric model 5. The arc A(i) generated by dividing a corresponding circle with respect to the two tangent points P(i,a) and P(i,b) is also computed and stored in the geometric model 5.

Figure 3C:
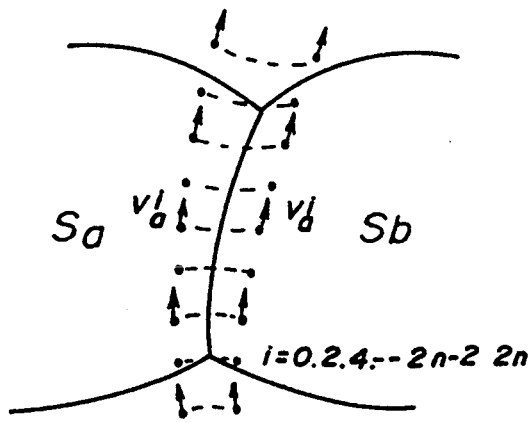
Figure 3D:
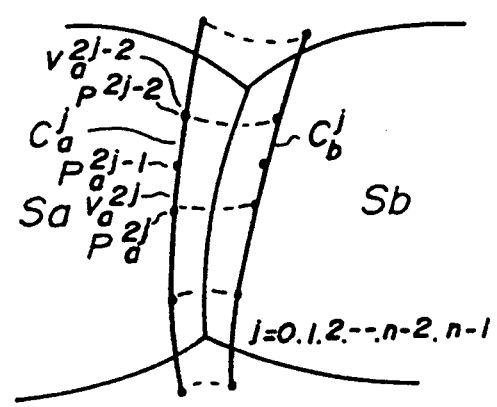

In Step 2:

The movement vectors V(i,a) and V(i,b) are computed and stored in the geometric model 5, the movement vectors V(i,a) and V(i,b) representing trajectories of the respective tangent points P(i,a) and P(i,b) in a case where each circle placed on the normal plane slides while being in contact with the two surfaces $S_a$ and $S_b$, as shown in FIG. 3C. However, in this case, an even number i (i=0, 2, 4, . . . , 2n−2, 2n) is used for this procedure.

Figure 1A:
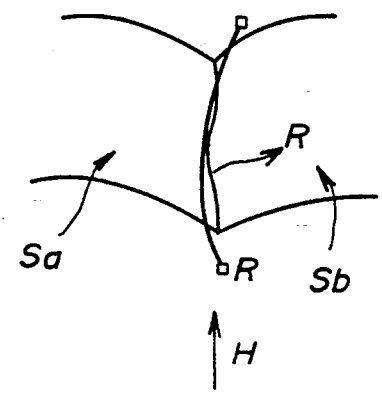
FIGS. 1A to 1D respectively show views for explaining a conventional rolling-ball blending method.
Figure 1B:
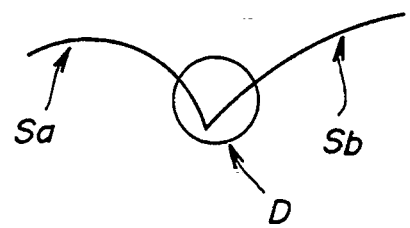
Figure 1C:
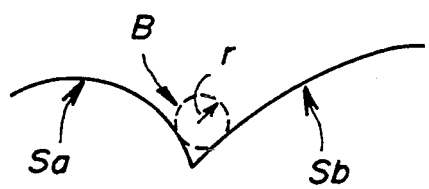
Figure 1D:
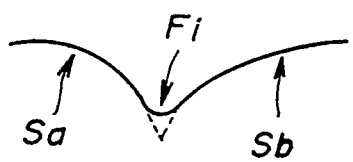

In Step 3:

By using the tangent point P(i,a) obtained in the above step 1 and movement vector V(i,a) obtained in the above step 2, n number of Bezier curves C(j,a) (j=0, 1, 2 ..., n−2, n−1) are generated on the surface $S_a$ and stored in the solid model 5. Each curve C(j,a) is generated from three tangent points P(2j,a), P(2j+1,a) and P(2j+2,a) and two movement vectors V(2j,a) and V(2j+2,a). Likewise, n number of Bezier curves C(j,b) are generated on the surface $S_b$ and stored in the geometric model 5, as shown in FIG. 1D. The curve segments C(j,a) and C(j,b) approximately represent trajectories of the tangent points between each circle and two surfaces $S_a$ and $S_b$. Incidentally, the Bezier curve is famous as a parametric curve. Hereupon, the parametric curve has a characteristic in that coordinate values of an arbitrary point on the parametric curve can be defined by one parameter. For example, if the coordinate of the arbitrary point is expressed as (x,y,z), the coordinate values x, y and z are defined by using a parameter t, as follows:

$x = x(t)$, $y = y(t)$, $z = z(t)$

Figure 14A:
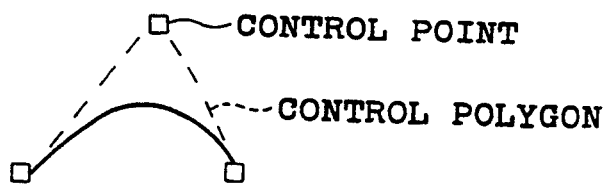
FIGS. 14A to 14C shows views for explaining conventional Bezier curves.
Figure 14B:
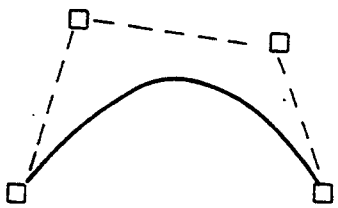
Figure 14C:
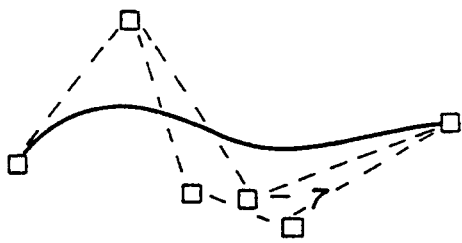

Thus, the parametric curve can be easily processed since it is not expressed by a complicated equation, such as an implicit function. The shape of the parametric curve can be controlled by control polygons each of which is determined by connecting two control points. That is, the designer can freely create an arbitrary curve by designating the control polygons, as shown in FIGS. 14A to 14C. The Bezier curve is uniformly defined by the control polygons. FIG. 14A shows a quadric Bezier curve. FIG. 14B shows a cubic Bezier curve. FIG. 14C shows a quartic Bezier curve.

Figure 3E:
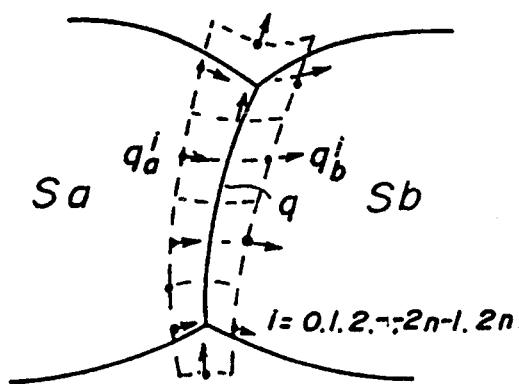

In Step 4:

The movement vector q(i) of the middle point of the arc A(i), in which i represents an even number (i=0, 2, 4, . . . , 2n−2, 2n), is computed and stored in the geometric model 5 while each circle is sliding on both of the two surfaces. In addition, the tangent vectors q(i,a) and q(i,b) of the end points of the arc A(i), in which i represents an odd number (i=1, 3, 5, . . . , 2n−3, 2n−1), is computed and stored in the geometric model 5 while each circle is sliding on both of the two surfaces, as shown in FIG. 3E.

Figure 3F:
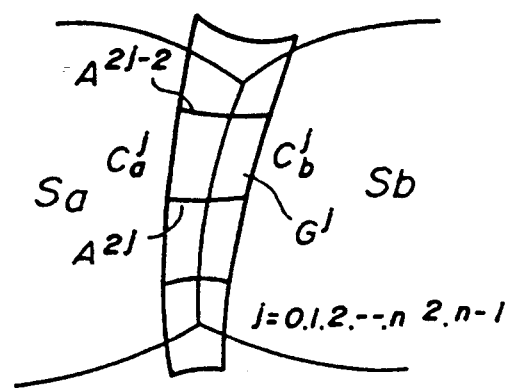
Figure 11:
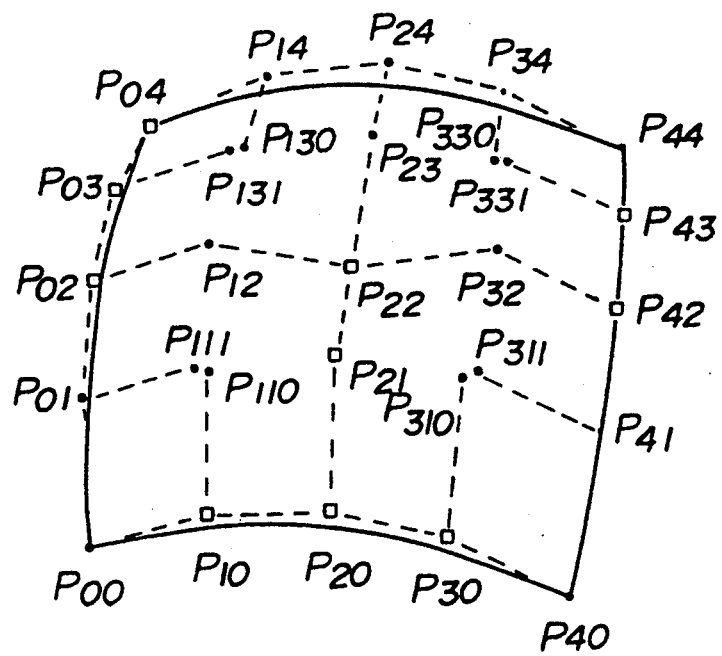
FIG. 11 shows a view for explaining a biquartic Gregory patch.

In Step 5:

As shown in FIG. 3F, n number of Gregory patches G(j) (j=0, 1, 2, . . . n−2, n−1) are generated from the arc A(i), the curve segment C(j,a) on the surface $S_a$ and the curve segment C(j,b) on the surface $S_b$. The Gregory patch is a kind of a parametric patch. The term "patch", as used herein, means an element of a surface. It is difficult to express a complicated surface by one equation. Accordingly, a surface is divided into a plurality of elements and these elements are smoothly connected to each other so as to represent the original surface. The Gregory patch has the characteristics in that:

1. The boundary curve of the Gregory patch is a Bezier curve;
2. Because of the convex hull property of the Gregory patch, an arbitrary point on the Gregory patch is located inside an area outlined by the control points. As a result, an intersection between the surfaces can be checked at a high speed;
3. A cross-boundary derivative can be independently defined for each boundary curve; and
4. A biquartic Gregory patch can become a Bezier surface at a specific condition where, in FIG. 11, a point $P_{130}$ is equal to a point $P_{131}$, a point $P_{111}$ is equal to a point $P_{110}$, a point $P_{310}$ is equal to a point $P_{311}$, and a point $P_{331}$ is equal to a point $P_{330}$. The term "a biquartic Gregory patch", as used herein, means that the Gregory patch is expressed by quartic equations of parameters u and v.

The movement vector q(i) and the tangent vectors q(i,a) and q(i,b) obtained in the step 4 are used for cross-boundary derivatives of the Gregory patch. After all the patches required for the fillet surface are generated, they are stored in the solid model 5 and the procedure is terminated. As shown in FIG. 3F, the Gregory patch G(j) has boundary curves defined by the arcs A(2j) and A(2j+2) and two curves C(j,a) and C(j,b). In addition, the patch G(j) has the cross-boundary derivatives q(2j), q(2j+2), q(j,a) and q(j,b) which are completely equal to cross-boundary derivatives of the fillet surface which are to be generated by sliding the circle on the two surfaces $S_a$ and $S_b$. Thus, the generated Gregory patch G(j) effectively approximates the desired fillet surface to be generated by sliding the circle on the two surfaces $S_a$ and $S_b$. The larger the number n of the Gregory patches is made, the more precisely the fillet surface can be approximated to the desired fillet surface.

FIGS. 5A to 5D respectively show views for explaining a method for generating tangent points between a circle and two surfaces, in which $F_a$ and $F_b$ respectively indicate tangent planes, $L_a$ and $L_b$ respectively indicate intersection lines, $P_a$, $P_b$, $P'_a$, and $P'_b$ respectively indicate tangent points. Those elements in FIGS. 5A to 5D which are the same as corresponding elements in FIGS. 3A to 3F are designated by the same reference numerals, and a description thereof will be omitted. Next follows a detailed description of the above step 1 with reference to FIGS. 5A to 5D and FIG. 6. According to the method of the present invention, the parameter t of the spine curve R is established first, and then the circle having the radius r(t) is placed on the normal plane while being in contact with two surfaces $S_a$ and $S_b$. Therefore, the tangent points $P_a$ and $P_b$ between the circle and two surfaces $S_a$ and $S_b$ are defined as a function of the parameter t. Hereupon, if an intersection line of offset surfaces of the two surfaces is used to define the spine curve R, the two surfaces can be smoothly connected as if they were processed in accordance with the rolling-ball blending method, each offset surface being spaced from the corresponding one of the two surfaces by a predetermined distance. Therefore, the present invention includes the conventional rolling-ball blending method. Alternatively, if the spine curve R is defined as a straight line, a fillet surface having a constant radius (or a variable radius) along the straight line can be generated. Thus, the present invention can satisfy various needs of a designer. The two tangent points $P_a$ and $P_b$ are computed based on the parameter t in accordance with the following steps 1.1 to 1.8. The method uses the geometric Newton-Raphson method, in which two tentative initial tangent points on the two surfaces $S_a$ and $S_b$ are converged into actual tangent points.

Figure 5A:
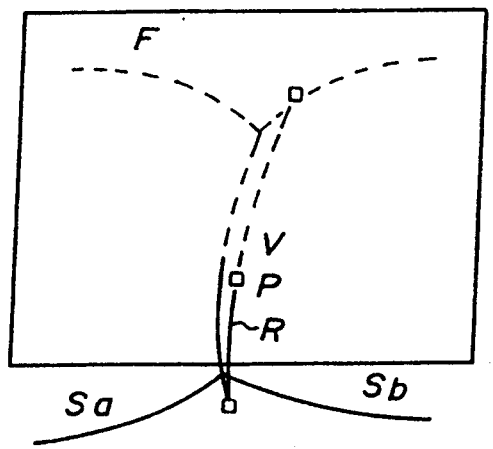
FIGS. 5A to 5D respectively show views for explaining a method for generating tangent points between a circle and two surfaces, executed by the shape modification part shown in FIG. 2.

In Steps 1.1:

The normal plane F of the curve R is computed from a point P on the curve R and the tangent vector V at the point P, with respect to the parameter t, and stored in the geometric model 5, as shown in FIG. 5A. In addition, a cross-section radius r of a fillet surface with respect to the parameter t is computed and stored in the geometric model 5.

In Step 1.2:

The tentative initial points $P_a$ and $P_b$ are respectively established on the two surfaces $S_a$ and $S_b$, in accordance with the geometric Newton-Raphson method, each of the points $P_a$ and $P_b$ being located at points closest to the point P, and stored in the geometric model 5. In addition, parameters $(u_a, v_a)$ corresponding to the point $P_a$, and parameters $(u_b, v_b)$ corresponding to the point $P_b$ are computed and stored in the geometric model 5.

In Step 1.3:

The tangent planes $F_a$ and $F_b$ at the initial points $P_a$ and $P_b$ on the two surfaces $S_a$ and $S_b$ are respectively computed and stored in the geometric model 5. If the normal vector n of the tangent plane of the parametric surface S is defined by the parameters (u,v), the tangent planes $F_a$ and $F_b$ are calculated as follows:

$$n' = [\partial S(u,v)/\partial u] \times [\partial S(u,v)/\partial v], \quad n = n'/|n'|$$

Figure 5B:
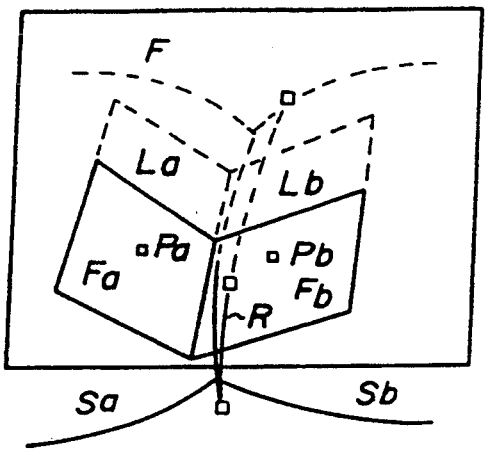

In Step 1.4:

The intersection lines $L_a$ and $L_b$ between the normal plane F of the curve R obtained in the above step 1.1 and the two tangent planes $F_a$ and $F_b$ obtained in the above step 1.3 are respectively computed and stored in the geometric model 5, as shown in FIG. 5B. Both of these two intersection lines $L_a$ and $L_b$ are definitely straight lines.

Figure 5C:
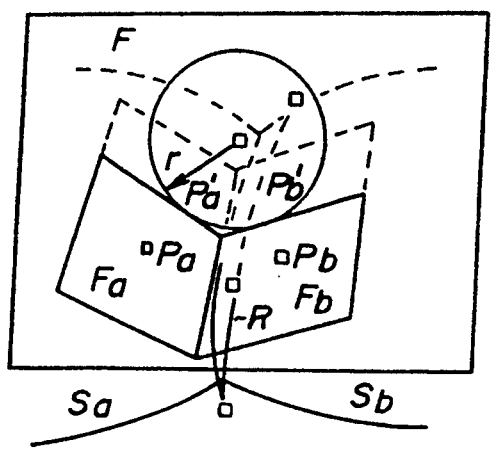

In Step 1.5:

The circle having the radius r determined at the step 1.1 is placed on the normal plane F while being in contact with the two straight lines $L_a$ and $L_b$. The tangent points $P'_a$ and $P'_b$ between the circle and the two lines are subsequently computed and stored in the geometric model 5, as shown in FIG. 5C.

In Step 1.6:

If $P_a$ is considered the same as $P'_a$ and $P_b$ the same as $P'_b$, these points can be regarded as the tangent points. That is, if the following two equations can be simultaneously established, in which $\epsilon$ represents a threshold value based on the geometric Newton-Raphson method, the points $P_a$ and $P_b$ can be considered as actual tangent points between the circle and the two surfaces $S_a$ and $S_b$:

$$|P'_a - P_a| < \epsilon, \quad |P'_b - P_b| < \epsilon$$

In this case, these two tangent points $P_a$ and $P_b$ are stored in the geometric model 5 and the procedure is terminated.

Figure 5D:
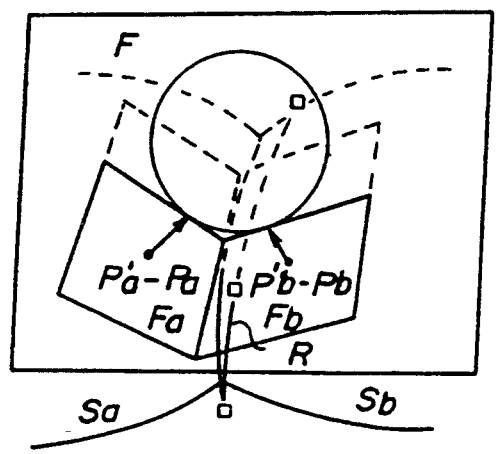

In Step 1.7:

The next initial points $(u_{a'}, v_{a'})$ and $(u_{b'}, v_{b'})$ to be respectively established on the two surfaces $S_a$ and $S_b$ are computed by using the points $P'_a$ and $P'_b$, in accordance with the following two equations, as shown in FIG. 5D, and then stored in the geometric model 5;

$$P'_a - P_a = \Delta u_a \cdot [\partial S_a(u_a, v_a)/\partial u] + \Delta v_a \cdot [\partial S_a(u_a, v_a)/\partial v],$$

$$P'_b - P_b = \Delta u_b \cdot [\partial S_b(u_b, v_b)/\partial u] + \Delta v_b \cdot [\partial S_b(u_b, v_b)/\partial v]$$

When $\Delta u_a$ and $\Delta v_a$ are calculated, the above first equation is inner-producted with two vectors $\partial S_a(u_a, v_a)/\partial u$, and $\partial S_a(u_a, v_a)/\partial v$ to obtain simultaneous equations. $u_a$, and $v_a$, are thus respectively calculated by the following equations;

$$u_{a'} = u_a + \Delta u_{a'} \quad v_{a'} = v_a + \Delta v_a$$

likewise, $u_b$, and $v_b$, can be obtained by the above second equation.

In Step 1.8:

The initial points $(u_{a'}, v_{a'})$ and $(u_{b'}, v_{b'})$ are respectively substituted for $(u_a, v_a)$ and $(u_b, v_b)$. The points $P_a$ and $P_b$ on the two surfaces $S_a$ and $S_b$ are renewed by the above parameters. After $P_a$, $P_b$, $(u_a, v_a)$, and $(u_b, v_b)$ are stored in the geometric model 5, the procedure is fed back to the step 1.3.

In step 1, the spine curve R is equally divided into 2n parts, and a plurality of circles having the radius r are placed on the two surfaces $S_a$ and $S_b$ for each divided point on the spine curve R. The tangent points P(i,a) and P(i,b) are then computed with respect to the parameter t of the curve R, and stored in the geometric model 5 (t=i/2n (i=0, 1, 2, ... 2n−1, 2n)). Moreover, 2n+1 number of circles placed on the two surfaces $S_a$ and $S_b$ are divided at the two tangent points P(i,a) and P(i,b) to generate the corresponding arcs A(i), the arcs A(i) also being stored in the geometric model 5.

Figure 7:
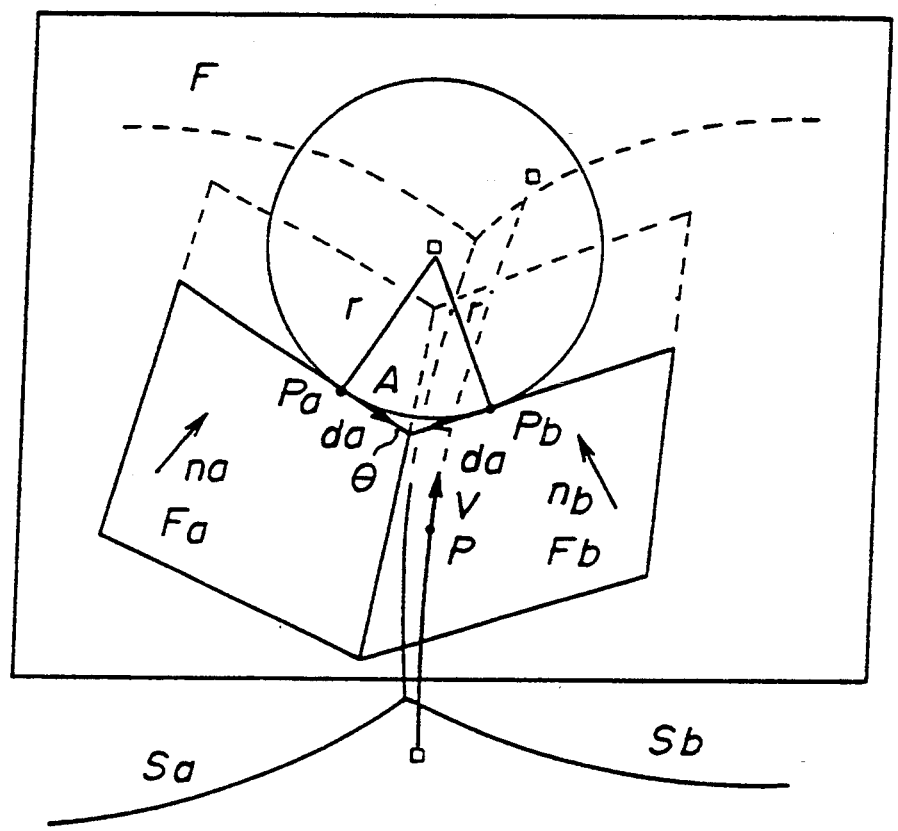
FIG. 7 shows a view for explaining a method for generating a movement vector at a tangent point, executed by the shape modification part shown in FIG. 2.

Next follows a detailed description of a method for generating a movement vector of a tangent point, with reference to FIG. 7, the movement vector representing a trajectory of the tangent point while the circle corresponding to the tangent point is sliding on the corresponding surface. As mentioned in the step 1, the tangent points $P_a$ and $P_b$ between the circle and two surfaces $S_a$ and $S_b$ and the parameters $(u_a, v_a)$ and $(u_b, v_b)$ are expressed as a function of t which also defines the spine curve R. When the parameter of the spine curve R varies from t to t+dt, the movement vectors $v_a$ and $v_b$, which respectively represent how corresponding tangent points $P_a$ and $P_b$ move, are calculated as follows:

$$\left.\begin{aligned}
v_a &= dP_a/dt \\
&= (\partial P_a/\partial u_a) \cdot u_a + (\partial P_a/\partial u_a) \cdot v_a, \\
v_b &= dP_a/dt \\
&= (\partial P_a/\partial u_b) \cdot u_b + (\partial P_a/\partial v_b) \cdot v_b
\end{aligned}\right\} \quad (1)$$

Hereinafter, $u_{a''}$ represents $du_a/dt$, $v_{a''}$ represents $dv_a/dt$ $u_{b''}$ represents $du_b/dt$, and $v_{b''}$ represents $dv_b/dt$. The parameters $(u_a, v_a)$ and $(u_b, v_b)$ corresponding to the two tangent points $P_a$ and $P_b$ are obtained in the above step 1. Therefore, $\partial P_a/\partial u_a$, $\partial P_a/\partial v_a$, $\partial P_b/\partial u_b$, and $\partial P_b/\partial v_b$ shown in the above equation (1) are defined as follows:

$$\begin{aligned}
\partial P_a/\partial u_a &= \partial S_a(u_a, v_a)/\partial u, \\
\partial P_a/\partial v_a &= \partial S_a(u_a, v_a)/\partial v, \\
\partial P_b/\partial u_b &= \partial S_b(u_b, v_b)/\partial u, \text{ and} \\
\partial P_b/\partial v_a &= \partial S_b(u_b, v_b)/\partial v.
\end{aligned}$$

Next follows a description of how these unknown terms $u_{a''}$, $u_{b''}$, $v_{a''}$, and $v_{b''}$ are calculated. In FIG. 7, if it is assumed that:

$n_a$ represents an normal vector of the surface $S_a$ at the tangent point $P_a$ (a normal vector of the tangent plane $F_a$), $n_b$ represents a normal vector unit of the surface $S_b$ at the tangent point $P_b$ (a normal vector of the tangent plane $F_b$), $d_a$ represents a unit directional vector of the intersection line $L_a$ between the normal plane F and the tangent plane $F_a$, $d_b$ represents a unit directional vector of the intersection line $L_b$ between the normal plane F and the tangent plane $F_b$, and $\theta$ represents an angle between the two vectors $d_a$ and $d_b$, the relationship among the point P on the spine curve R, the tangent vector v=dP/dt at the point P, the two tangent points $P_a$ and $P_b$, and the radius r of the section of the circle is defined as follows:

$$P_a + [r \cot(\theta/2)]d_a = P_b + [r \cot(\theta/2)]d_b \quad (2)$$

$$(P_a + P_b - 2P) \cdot v = 0 \quad (3)$$

In addition, $d_a$, $d_b$, and $\cot(\theta/2)$ are defined as follows:

$$d_a = (v \times n_a)/|v \times n_a|,$$
$$d_b = (n_b \times v)/|n_b \times v|,$$

$$\cot(\theta/2) = \sqrt{(1 + d_a \cdot d_b)/(1 - d_a \cdot d_b)}$$

Hereupon, if the above equations (2) and (3) are differentiated by the parameter t, the following equations (4) and (5) are generated;

$$a_1 u_a + a_2 v_a + a_3 u_b + a_4 v_b = a_5 \quad (4)$$

$$a_1 u_a + A_2 v_a + A_3 u_b + A_4 v_b = A_5 \quad (5)$$

If the parameter $(u_a, v_a)$ of the surface $S_a$ and the parameter $(u_b, v_b)$ of the surface $S_b$ are predetermined, the vector coefficients $a_1$, $a_2$, $a_3$, $a_4$ and $a_5$ and the scalar coefficients $A_1$, $A_2$, $A_3$, $A_4$ and $A_5$ are obtained by calculating the following terms (6).

r, P, $P_a$, $P_b$, $n_a$, $n_b$, dr/dt, dP/dt, $d^2P/dt^2$, $\partial P_a/\partial u_a$, $\partial P_a/\partial v_a$, $\partial P_b/\partial u_b$, $\partial P_b/\partial v_b$, $\partial n_a/\partial u_a$, $\partial n_a/\partial v_a$, $\partial n_b/\partial u_b$, $\partial n_b/\partial v_b$. (6)

Thus, equations by which the unknown terms $u_{a''}$, $v_{a''}$, $u_{b''}$ and $v_{b''}$ can be solved are obtained from the equations (4) and (5).

In the step 2, n+1 number of movement vectors V(i,a) and V(i,b), t=i/2n (i=0, 2, 4, ... 2n−2, 2n), are computed and stored in the geometric model 5. Since no movement vector corresponding to an odd number i is needed when the curves representing trajectories of the tangent points are generated in the step 3, an even number i is selected.

Figure 8:
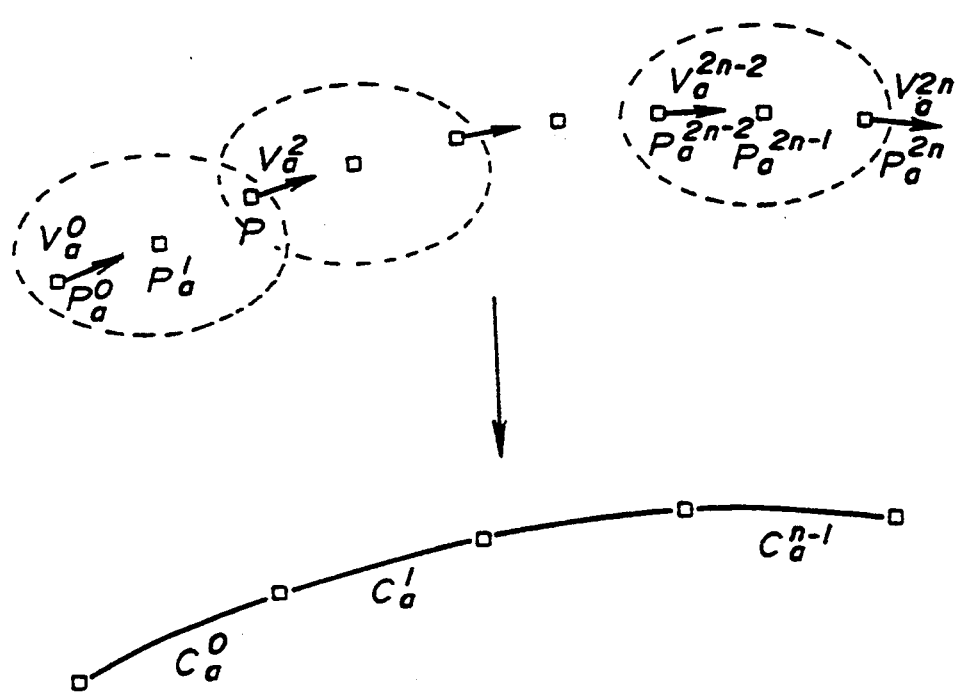
FIG. 8 shows a view for explaining a method for generating a curve segment representing a trajectory, executed by the shape modification part shown in FIG. 2.

Next follows a description of a method for generating a curve segment representing a trajectory, with reference to FIG. 8. In the above step 3, two curve segments approximately representing the trajectories drawn by the tangent points $P_a$ and $P_b$ between the circle and the two curves $S_a$ and $S_b$ are generated. According to this method, the trajectory is drawn by the tangent point $P_a$ by using the tangent point P(i,a) (i=0, 1, 2 ... 2n−1, 2n)

and the vector V(i,a) (i=0, 2, 4, ... 2n−2, 2n). The trajectory drawn by the tangent point $P_b$ of the surface $S_b$ can be generated in the same manner. According to the method of the present invention, each curve segment approximately representing a trajectory of a tangent point is generated from three successive tangent points and two movement vectors. That is, referring to FIG. 8, n number of curves C(j,a) (j=0, 1, 2 ... n−2, n−1) are generated from 2n+1 number of tangent points P(i,a) and n+1 number of movement vectors V(i,a), as follows:

First, three tangent points P(2j,a), P(2j+1,a) and P(2j+2,a) and two movement vectors V(2j,a) and V(2j+2,a) are extracted from the geometric model 5. A quartic Bezier curve C(j,a) which satisfies the following table is then generated:

| PARAMETERS | 0.0 | 0.5 | 1.0 |
|---|---|---|---|
| POSITION | $P_a^{2j}$ | $P_a^{2j+1}$ | $P_a^{2j+2}$ |
| TANGENTIAL VECTORS | $\Delta t \times V_a^{2j}$ | — | $\Delta t \times V_a^{2j+2}$ |

The tangent vectors at the parameters 0.0 and 1.0 are obtained by multiplying the movement vectors V(2j,a) and V(2j+2,a) by $\Delta t = 1/n$, because the two tangent points P(2j,a) and P(2j+2,a) are separated from each other by $\Delta t$ in the parameter space of the spine curve R. Thus, five control points $c_0$, $c_1$, $c_2$, $c_3$ and $c_4$ on the quartic Bezier curve C(j,a) are defined as follows:

$$c_0 = P(2j, a),$$
$$c_1 = P(2j, a) + (1/4n) \cdot v(2j, a),$$
$$c_2 = -(5/6) \cdot P(2j, a) + (8/3) \cdot P(2j+1, a)$$
$$\quad -(5/6) \cdot P(2j+2, a) - (1/6n) \cdot v(2j, a) +$$
$$\quad (1/6n) \cdot v(2j+2, a)$$
$$c_3 = P(2j+2, a) - (1/4n) \cdot v(2j+2, a), \text{ and}$$
$$c_4 = P(2j+2, a)$$

After n number of quartic Bezier curved lines C(j,a) (j=0, 1, 2, ... n−2, n−1) are generated, they are smoothly connected to each other at the end generated on the two surfaces $S_a$ and Sb, and then points and become a curve segment. In the step 3, the curve segments C(j,a) and C(j,b) are respectively generated on the two surfaces $S_a$ and $S_b$, and then stored in the geometric model 5.

Figure 9:
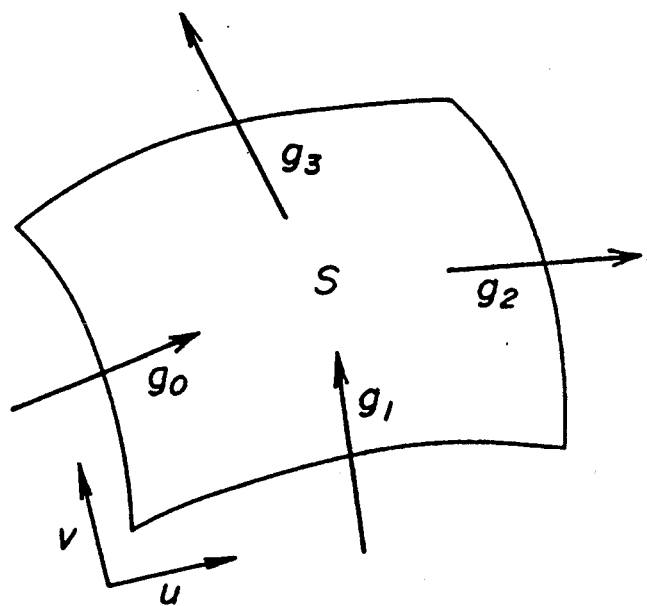
FIG. 9 shows a view for explaining a method for generating a cross-boundary derivative of a surface, executed by the shape modification part shown in FIG. 2.

FIG. 9 shows a view for explaining a method for generating a cross-boundary derivative of a surface, which represents a decline of the surface in a direction across a boundary curve at a middle point thereof. Thus, the cross-boundary derivative of the surface S(u,v) (0<u,v<1) is defined as follows:

$$g_0 = \left.\frac{\partial S(u, v)}{\partial u}\right|_{u=0.0, v=0.5}, g_1 = \left.\frac{\partial S(u, v)}{\partial u}\right|_{u=0.5, v=0.0}$$

$$g_2 = \left.\frac{\partial S(u, v)}{\partial u}\right|_{u=1.0, v=0.5}, g_3 = \left.\frac{\partial S(u, v)}{\partial u}\right|_{u=0.5, v=1.0}$$

Figure 10:
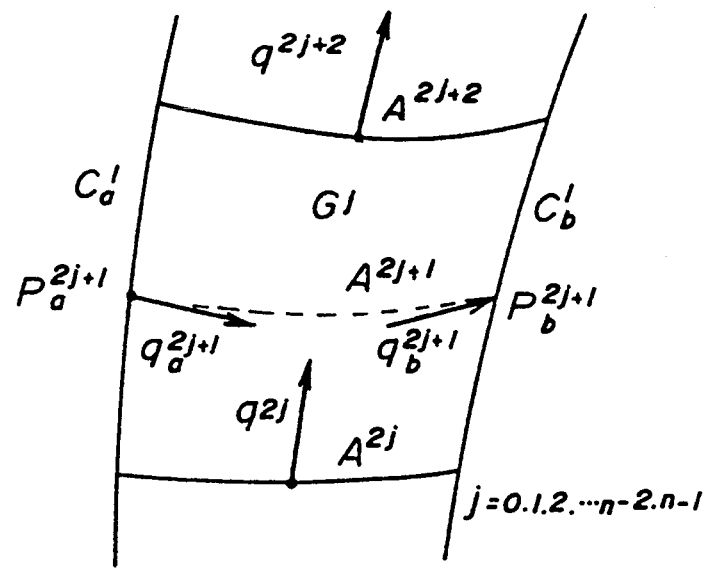
FIG. 10 shows a view for explaining a method for generating a cross-boundary derivative of a fillet surface, executed by the shape modification part shown in FIG. 2.

In addition, by using the arc A(i) (i=0, 1, 2, ... 2n−1, 2n) obtained in the step 1 and curve C(j,a) (j=0, 1, 2, ..., n−2, n−1) obtained in the step 3, the surface G (j) representing the fillet surface can be expresses as a surface having boundary curves A(2j), A(2j+2), C(j,a) and C(j,b), as shown in FIG. 10.

Four cross-boundary derivatives in the surface G(j) are defined by calculating the following two kinds of vectors;

1. movement vectors q(2j) and q(2j+2) representing how the respective middle points of the arcs A(2j) and A(2j+2) move while the circle is sliding on the two surfaces $S_a$ and $S_b$; and 2. tangent vectors q(2j+1,a) and q(2j+a,b) at the end points of the arc A(2j+1) which connects the respective middle points of the quartic Bezier curves C(j,a) and C(j,b), to each other.

The tangent vectors q(2j+1,a) and q(2j+1,b) are computed from the radius and center angle of the arc A(2j+1). In FIG. 7, a middle point Q of the arc A(i) is defined as follows:

$$Q = (P_a + P_b)/2 + r(1 - \sin\theta/2) \cdot (d_a + d_b)/|d_a + d_b| \tag{7}$$

If the above equation (7) is differentiated by the parameter t, the right term of q=dQ/dt includes only the terms shown in the equation (6) and $u_a''$, $u_b''$, $v_a''$ and $v_b''$, which have already been calculated in the step 2.

In the step 4, the movement vector q(i) of the middle point of the arc A(i), in which t=i/2n (i=0, 2, 4, ... 2n−2, 2n), is calculated and then stored in the geometric model 5. The reason why i is an even number is that the movement vector of the middle point between the arcs A(2j) and A(2j+2) is used as a cross-boundary derivative of the surface G(j) (j=0, 1, 2, ... n−2, n−1) representing the fillet surface. In addition, the tangent vectors q(i,a) and q(i,b) at the end points of the arc A(i) (i=1, 3, 5, ... 2n−3, 2n−1) are calculated and then stored in the geometric model 5. These tangent vectors are used for the cross-boundary derivatives of the surfaces G(j). Incidentally, when the movement vector q(i) is actually used as the cross-boundary derivative of the surface, its length must be multiplied by $\Delta t = 1/n$, as in the step 3 where the movement vectors V(i,a) and V(i,b) of the tangent points are multiplied by $\Delta t$.

Next follows a description of a method for generating a fillet surface by using a biquartic Gregory patch. As shown in FIG. 10, the surface G(j) (j=0, 1, 2, ... n−2, n−1) representing a fillet surface has the four boundary curves A(2j), A(2j+2), C(j,a) and C(j,b) and four cross-boundary derivatives q(2j), q(2j+2), q(2j+1,a) and q(2j+1,b). According to the present invention, these boundary curves and cross-boundary derivatives are expressed by the biquartic Gregory patch. First, a description will be given of the biquartic Gregory patch.

The biquartic Gregory patch is expressed by the following equation (8), in which B(4,i) represents the following biquartic Bernstain basic function:

$$B_i^4(t) = \binom{4}{i} t^i (1-t)^{4-i}$$

Figure 12:
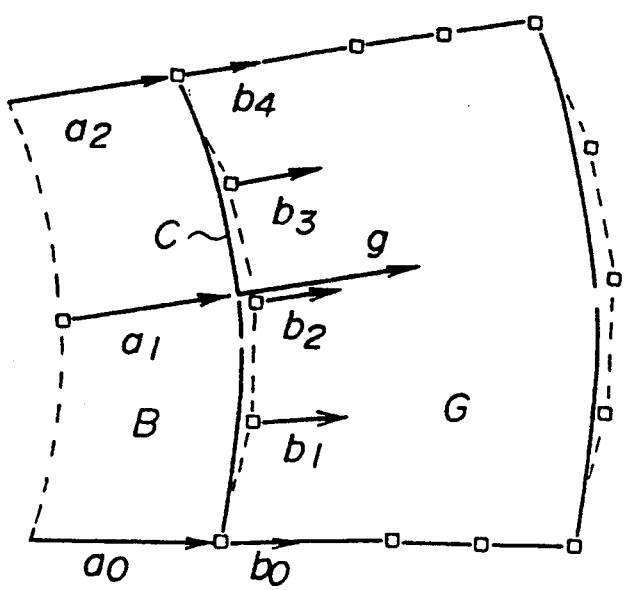
FIG. 12 shows a view for explaining a connecting condition of the biquartic Gregory patch.

As shown in FIG. 7, this patch is composed of twenty-nine control points.

$$S(u, v) = \sum_{i=0}^{4} \sum_{j=0}^{4} B_i(u) B_j^4(v) P_{ij} (0 \leq u, v \leq 1), \tag{8}$$

where $P_{11} = (uP_{110} + vP_{111})/u + v$,
$P_{13} = [uP_{130} + (1-v)P_{131}]/[u + (1-v)]$,
$P_{31} = [(1-u)P_{310} + vP_{311}]/[(1-u) + v]$, and
$P_{33} = [(1-u)P_{330} + (1-v)P_{331}]/[(1-u) + (1-v)]$ Thus, the boundary curve of the biquartic Gregory patch is expressed as a quartic Bezier curve. Therefore, $n+1$ number of arcs $A(i)$ $(i=0, 2, 4, \ldots 2n-2, 2n)$ are effectively approximated by the quartic Bezier curve. After these arcs $A(i)$ are approximated, the four boundary curves of the Gregory patch representing the fillet surface are entirely determined. Thus, the sixteen control points $P_{ij}$ ($i=0, 4$ or $j=0, 4$) representing the boundary curve are determined from among the twenty-nine control points shown in FIG. 11. The remaining thirteen control points inside the biquartic Gregory patch are then generated from the cross-boundary derivatives $tq(i)$, $q(i,a)$ and $q(i,b)$ obtained in the step 4, as follows:

One boundary curve of the biquartic Gregory patch will be discussed below. Hereupon, as shown in FIG. 12, g represents a cross-boundary derivative of the boundary curve C of the Gregory patch, and $b_0$, $b_1$, $b_2$, $b_3$ and $b_4$ respectively represent vectors which are directed to the inside control points from each adjacent control points. The unknown three control points vectors $b_1$, $b_2$ and $b_3$ are calculated from the three vectors $a_0$, $a_1$ and $a_2$ and three constants $k_0$, $k_1$ and $k_2$, in accordance with the following equations. Incidentally, in FIG.12, virtual patch B having the three vectors $a_1$, $a_2$ and $a_3$ is referred to as a basic patch hereinafter.

$$a_0 = b_0/|b_0|,$$
$$a_2 = b_4/|b_4|,$$
$$a_1 = (4g/|g| - a_0 - a_2)/2,$$
$$k_0 = |b_0|,$$
$$k_2 = |b_4|, \text{ and}$$
$$k_1 = (|g| - k_0 - k_2)/2.$$

The vectors $b_1$, $b_2$ and $b_3$ are calculated by the following equations (9), (10) and (11) in which the basic patch B and Gregory patch G connected with tangential continuity:

$$b_1 = (k_1 a_0 + k_0 a_1)/2 \quad (9)$$

$$b_2 = (k_2 a_0 + 4k_1 a_1 + k_0 a_2)/6 \quad (10)$$

$$b_3 = (k_2 a_1 + k_1 a_2)/2 \quad (11)$$

Figure 13A:
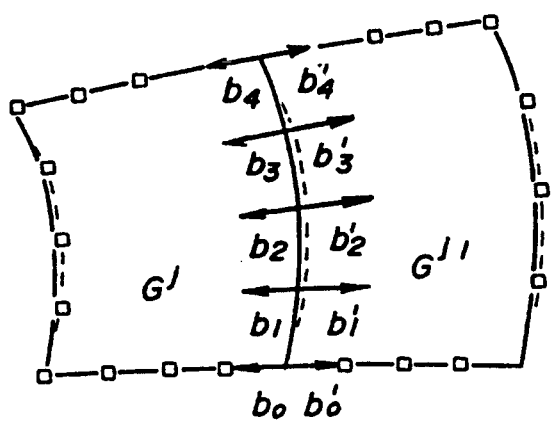
FIGS. 13A to 13D respectively show views for explaining a connection of adjacent Gregory patches.
Figure 13B:
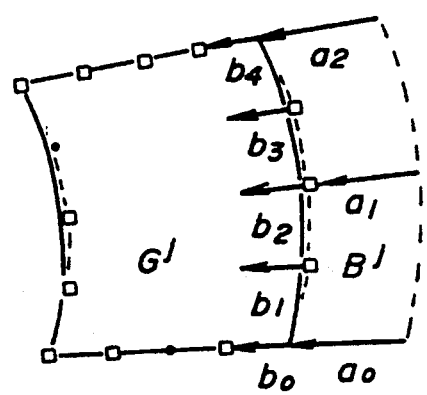
Figure 13C:
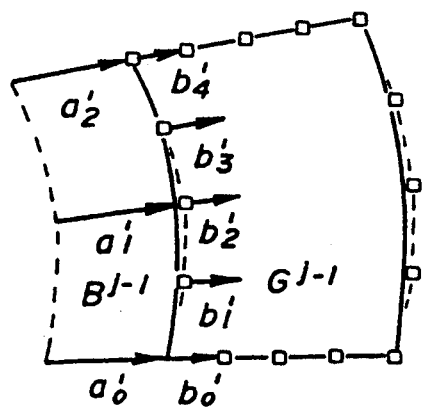
Figure 13D:
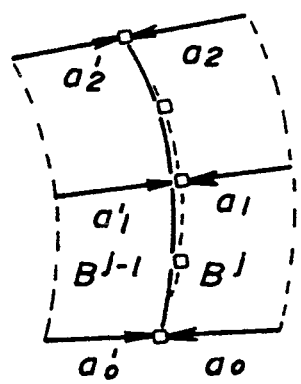

The control points of the biquartic Gregory patch except for central middle point $P_{22}$ are determined if twelve vectors are calculated from the four boundary curves and cross-boundary derivatives. The control point $P_{22}$ is calculated by using the condition in which the central coordinate of the Gregory patch $G(j)$ ($j=0, 1, 2, \ldots n-2, n-1$), which is the coordinate of $(u,v)=(0.5,0.5)$, is equal to the middle point of the arc $A(2j+1)$ passing through the patch. All the control points of the biquartic Gregory patch are thus generated. The Gregory patch $G(j)$ is, as shown in FIG.13A, connected to the adjacent patch $G(j+1)$ with tangential continuity, as $G^1$ continuity. This is because, as shown in FIGS. 13B and 13C, the Gregory patch $G(j)$ is connected to the basic patch $B(j)$ with tangential continuity, whereas the Gregory patch $G(j+1)$ is connected to the basic patch $B(j+1)$ with tangential continuity. In addition, the two basic patches $B(j)$ and $B(j+1)$ completely coincide with each other except the directions of the vectors are reversed, and thus they are connected to each other with tangential continuity, as shown in FIG. 13D. Therefore, the two Gregory patches are connected to each other with tangential continuity. In addition, the Gregory patch $G(j)$ smoothly connects the original surfaces $S_a$ and $S_b$ to each other via the curves $C(j,a)$ and $C(j,b)$ thereof because the tangent plane of the Gregory patch $G(j)$ coincides with the two surfaces $S_a$ and $S_b$ at the middle points of both end points of the curves $C(j,a)$ and $C(j,b)$. However, these surfaces are not connected with tangential continuity.

In the step 5, after n number of the biquartic Gregory patch $G(j)$ ($j=0, 1, 2, \ldots n-2, n-1$) are generated as the fillet surface, they are stored in the geometric model 5 and the procedure is terminated.

Incidentally, the following relationship must be considered when considering the above description.

$P_a^i$ represents $P(i,a)$,
$P_b^i$ represents $P(i,b)$,
$P_a^{2J}$ represents $P(2j,a)$,
$P_a^{2JH}$ represents $P(2J+1,a)$,
$P_b^{2J+2}$ represents $P(2j+2,a)$,
$V_a^i$ represents $V(i,a)$,
$V_b^i$ represents $V(i,b)$,
$V_a^{2J}$ represents $V(2j,a)$,
$V_a^{2J+2}$ represents $V(2j+2, a)$,
$A^i$ represents $A(i)$,
$A^{2j}$ represents $A(2j)$,
$A^{2j+2}$ represents $A(2j+2)$,
$B_i^4$ represents $B(4,i)$,
$C_a^j$ represents $C(j,a)$,
$C_b^j$ represents $C(j,b)$,
$q_a^i$ represents $q(i,a)$,
$q_b^i$ represents $q(i,b)$,
$q^i$ represents $q(i)$,
$q^{2j}$ represents $q(2j)$,
$q^{2j+2}$ represents $q(2j+2)$,
$G^j$ represents $G(j)$,
$u_a$ represents $u_a''$,
$v_a$ represents $v_a''$,
$u_b$ represents $u_b''$, and
$v_b$ represents $v_b''$.

Further, the present invention is not limited to these preferred embodiments, and various variations and modifications may be made without departing from the scope of the present invention.

What is claimed is:

1. A method for generating a fillet surface which smoothly connects two surfaces to each other, using a three-dimensional (3D) computer-aided design (CAD) system, the method comprising the steps of:

inputting information designating a spine curve near a boundary between the two surfaces;

using a shape modification part of the 3D CAD system, placing a predetermined curve on a normal plane of the spine curve at an arbitrary point on the spine curve so that the predetermined curve is in contact with the two surfaces;

using the shape modification part of the 3D CAD system, sliding the predetermined curve, while in contact with the two surfaces, in order to generate trajectories of two tangent points between the predetermined curve and the two surfaces, the fillet surface being defined by a trajectory of the predetermined curve and the trajectories of the two tangent points; and using the shape modification part of the 3D CAD system, generating a parametric surface which approximately and parametrically represents the fillet surface, by using the trajectories of the two tangent points and the predetermined curve.

2. A method according to claim 1, wherein the predetermined curve is a parametric curve.

3. A method according to claim 1, wherein the predetermined curve comprises an outline of a circle.

4. A method for generating a fillet surface which smoothly connects two surfaces to each other, using a three-dimensional (3D) computer-aided design (CAD) system, the method comprising the steps of:
   a) inputting information designating a spine curve which is located near a boundary between the two surfaces;
   b) using a shape modification part of the 3D CAD system, placing a circle on a normal plane of the spine curve at an arbitrary point on the spine curve, so that the circle is in contact with the two surfaces;
   c) using the shape modification part of the 3D CAD system, sliding the circle, while in contact with the two surfaces, to generate trajectories of two tangent points between the circle and the two surfaces, so that the fillet surface is defined by a trajectory of an outline of the circle and the trajectories of the two tangent points; and
   d) using the shape modification part of the 3D CAD system, generating a Gregory patch which approximately and parametrically represents the fillet surface, by using the trajectories of the two tangent points and the outline of the circle.

5. A method according to claim 4, wherein the step of placing a circle is performed at least twice so that each circle is placed on each normal plane of the spine curve while in contact with the two surfaces.

6. A method according to claim 4, wherein the setting means of said processing means places at least two circles on corresponding two normal planes of the spine curve at two arbitrary points on the spine curve so that each of the circles can be in contact with the two surfaces.

7. A method for generating a fillet surface which smoothly connects two surfaces to each other, using a three-dimensional (3D) computer-aided design (CAD) system, the method comprising the steps of:
   inputting information designating a spine curve defined by a parameter t near a boundary between the two surfaces;
   using a shape modification part of the 3D CAD system, equally dividing the spine curve into 2n parts;
   using the shape modification part of the 3D CAD system, placing 2n+1 number of circles each having a radius is expressed by a function having the parameter t, on 2n+1 number of normal planes of the spine curve at 2n+1 number of points on the spine curve, each of the points being defined by the parameter $t = i/2n$ (i=0, 1, 2, ... 2n+1, 2n), and each of the circles in contact with the two surfaces;
   using the shape modification part of the 3D CAD system, sliding each of the circles, while in contact with the two surfaces, in order to generate a movement vector representing how each of tangent points between each of the circles and the two surfaces moves when each of the circles slides;
   using the shape modification part of the 3D CAD system, generating n number of Bezier curves by each of the tangent points and the movement vector, the Bezier curves approximately and parametrically representing a trajectory of each of the tangent points; and
   using the shape modification part of the 3D CAD system, generating a Gregory patch which approximately and parametrically represents the fillet surface, by using the Bezier curve and an outline of each of the circles.

8. A method according to claim 7, wherein the radius of each of the circles varies in accordance with the parameter t.

9. A method according to claim 7, wherein said step of sliding each of the circles generates a plurality of movement vectors corresponding to the number of tangent points defined by an even number i (i=0, 2, 4, ... 2n−2, 2n).

10. A method according to claim 7 further comprising the steps of:
   generating an arc for each of the circles by truncating each of the circles at corresponding tangent points, the arc defining the fillet surface;
   generating a movement vector of a middle point of the arc, which represents how the middle point of the arc moves when a corresponding circle slides, the movement vector of the middle point of the arc being used for a cross-boundary derivative of the Gregory patch; and
   generating tangent vectors at the tangent points, the tangent vectors being used for the cross-boundary derivative of the Gregory patch.

11. A method according to claim 10, wherein each arc is defined by the parameter t, and said step of generating a movement vector of a middle point of the arc generates a plurality of movement vectors of the middle points of the arcs defined by an even number i (i=0, 2, 4, ... 2n−2, 2n).

12. A method according to claim 10, wherein said step of generating tangent vectors generates a plurality of tangent vectors at the tangent points defined by an odd number i (i=1, 3, 5, ... 2n−3, 2n−1).

13. A three-dimensional (3D) computer aided design (CAD) apparatus which receives a geometric model representing a shape of a model, comprising:
   a) processing means for processing the geometric model;
   b) memory means, coupled to said processing means, for storing the the geometric model processed by said processing means; and
   c) reference means, coupled to said memory means, for extracting data stored in said memory means;
   wherein said processing means includes means for generating a fillet surface which smoothly connects two surfaces of the model to each other and includes:
      1) drawing means for drawing spine curve near a boundary between the two surfaces;
      2) setting means for placing a predetermined curve on a normal plane of the spine curve at an arbitrary point on the spine curve so that the predetermined curve is in contact with the two surfaces;
      3) moving means for sliding the predetermined curve, while in contact with the two surfaces, in order to generate trajectories of two tangent points between the predetermined curve and the two surfaces, the fillet surface being defined by a trajectory of the predetermined curve and the trajectories of the two tangent points; and
      4) fillet surface generating means for generating a parametric surface which approximately and parametrically represents the fillet surface, by using the trajectories of the two tangent points and the predetermined curve.

14. A apparatus according to claim 13, wherein the predetermined curve is a parametric curve.

15. A apparatus according to claim 13, wherein the predetermined curve comprises an outline of a circle.

16. A three-dimensional (3D) computer aided design (CAD) apparatus which receives a geometric model representing a shape of a model, comprising:
- a) processing means for processing the geometric model;
- b) memory means, coupled to said processing means, for storing the geometric model processed by said processing means; and
- c) reference means, coupled to said memory means, for extracting data stored in said memory means:

wherein said processing means includes means for generating a fillet surface which smoothly connects two surfaces of the model to each other and includes:
1) drawing means for drawing spine curve near a boundary between the two surfaces;
2) setting means for placing a circle on a normal plane of the spine curve at an arbitrary point on the spine curve so that the circle is in contact with the two surfaces;
3) moving means for sliding the circle, while in contact with the two surfaces, in order to generate trajectories of two tangent points between the circle and the two surfaces, the fillet surface being defined by a trajectory of the circle and the trajectories of the two tangent points; and
4) fillet surface generating means for generating a Gregory patch which approximately and parametrically represents the fillet surface, by using the trajectories of the two tangent points and the circle.

17. A three-dimensional (3D) computer aided design (CAD) apparatus which receives a geometric model representing a shape of a model, comprising:
- a) processing means for processing the geometric model;
- b) memory means, coupled to said processing means, for storing the geometric model processed by said processing means; and
- c) reference means, coupled to said memory means, for extracting data stored in said memory means;

wherein said processing means includes means for generating a fillet surface which smoothly connects two surfaces of the model to each other and includes:
1) drawing means for drawing spine curve defined by a parameter t near a boundary between the two surfaces;
2) dividing means for equally dividing the spine curve into 2n parts;
3) setting means for placing $2n+1$ number of circles each having a radius expressed by a function having the parameter t, on $2n+1$ number of normal planes of the spine curve at $2n+1$ number of points on the spine curve, each of the points being defined by the parameter $t=i/2n$ ($i=0, 1, 2, \ldots 2n-1, 2n$), and each of the circles is in contact with the two surfaces;
4) moving means for sliding each of the circles, while in contact with the two surfaces, in order to generate a movement vector representing how each of tangent points between each of the circles and the two surfaces moves when each of the circles slides;
5) approximately means for generating n number of Bezier curves by each of the tangent points and the movement vector, the Bezier curves approximately and parametrically representing a trajectory of each of the tangent points; and
6) fillet surface generating means for generating a Gregory patch which approximately and parametrically represents the fillet surface, by using the Bezier curve and an outline of each of the circles.

18. A apparatus according to claim 17, wherein the radius of each of the circles varies in accordance with the parameter t.

19. An apparatus according to claim 17, wherein said moving means generates a plurality of movement vectors corresponding to the number of tangent points defined by an even number i ($i=0, 2, 4, \ldots 2n-2, 2n$).

20. An apparatus according to claim 17, wherein said processing means further comprises:
arc generating means for generating an arc for each of the circles by truncating each of the circle at corresponding tangent points, the arc defining the fillet surface; and
first cross-boundary derivative generating means for generating a movement vector of a middle point of the arc, which represents how the middle point of the arc moves when a corresponding circle slides and which is used for a cross-boundary derivative of the Gregory patch; and
second cross-boundary derivative generating means for generating tangent vectors at the tangent point, which are used for the cross-boundary derivative of the Gregory patch.

21. An apparatus according to claim 20, wherein each arc is defined by the parameter t, and the first cross-boundary derivative means of said processing means generates a plurality of movement vectors of the middle points of the arcs defined by an even number i ($i=0, 2, 4, \ldots 2n-2, 2n$).

22. A method according to claim 20, wherein the second cross-boundary derivative means generates a plurality of tangent vectors at the tangent points defined by an odd number i ($i=1, 3, 5, \ldots 2n-3, 2n-1$).

* * * * *